US010291941B2

(12) United States Patent
Lu et al.

(10) Patent No.: US 10,291,941 B2
(45) Date of Patent: May 14, 2019

(54) PRE-CACHING VIDEO CONTENT TO DEVICES USING LTE BROADCAST

(71) Applicant: AT&T MOBILITY II LLC, Atlanta, GA (US)

(72) Inventors: Rong Lu, Seattle, WA (US); Richard Silvestri, Ft. Pierce, FL (US)

(73) Assignee: AT&T Mobility II LLC, Atlanta, GA (US)

( * ) Notice: Subject to any disclaimer, the term of this patent is extended or adjusted under 35 U.S.C. 154(b) by 134 days.

(21) Appl. No.: 15/454,660

(22) Filed: Mar. 9, 2017

(65) Prior Publication Data
US 2018/0262787 A1 Sep. 13, 2018

(51) Int. Cl.
*H04N 21/231* (2011.01)
*H04N 21/262* (2011.01)
(Continued)

(52) U.S. Cl.
CPC ... *H04N 21/23106* (2013.01); *H04L 65/4076* (2013.01); *H04N 21/26216* (2013.01); *H04N 21/26258* (2013.01); *H04N 21/4147* (2013.01); *H04N 21/6131* (2013.01); *H04N 21/64738* (2013.01)

(58) Field of Classification Search
None
See application file for complete search history.

(56) References Cited

U.S. PATENT DOCUMENTS 7,590,060 B2   9/2009   Miceli et al.
8,289,892 B2   10/2012  Hyun et al.
(Continued)

FOREIGN PATENT DOCUMENTS

EP   2908591 A1   8/2015
WO   2015199584   12/2015
WO   2016074724 A1   5/2016

OTHER PUBLICATIONS

"LTE Broadcast—Lessons Learned from Trials and Early Deployments", Exp Way, expway.com; LTE Broadcast Alliance, Nov. 2016, 1-17.
(Continued)

*Primary Examiner* — Justin E Shepard
(74) *Attorney, Agent, or Firm* — Guntin & Gust, PLC; Mark Wilinski

(57) ABSTRACT

Aspects of the subject disclosure may include, for example, a device including a processing system that receives items of media content; delivers the items over a network according to a schedule determined by a content delivery scheduling system; detects a level of broadcast network capacity utilization; and periodically generates and transmits to the scheduling system a forecast of network capacity utilization. A new forecast is generated and transmitted responsive to the network capacity utilization deviating from the forecast by more than a predetermined tolerance. A resource for delivering the items of media content is dynamically assigned to the processing system by the scheduling system in accordance with a current forecast. The items of media content comprise a queue accessible to the content delivery scheduling system; the queue is maintained by the scheduling system and is uniquely assigned to the processing system. Other embodiments are disclosed.

20 Claims, 7 Drawing Sheets

(51) Int. Cl.
*H04N 21/61* (2011.01)
*H04N 21/4147* (2011.01)
*H04N 21/647* (2011.01)
*H04L 29/06* (2006.01)

(56) References Cited

U.S. PATENT DOCUMENTS

| | | |
|---|---|---|
| 8,989,021 B2 | 3/2015 | Simon |
| 9,025,498 B2 | 5/2015 | Maggenti et al. |
| 9,065,765 B2 | 6/2015 | Alisawi |
| 9,065,777 B2 | 6/2015 | Stanwood et al. |
| 9,154,826 B2 | 10/2015 | Raleigh et al. |
| 9,215,569 B2 | 12/2015 | Kotecha et al. |
| 9,282,354 B2 | 3/2016 | Lo et al. |
| 9,326,185 B2 | 4/2016 | Alisawi |
| 9,351,149 B2 | 5/2016 | Naik et al. |
| 9,451,481 B2 | 9/2016 | Lin et al. |
| 9,503,510 B2 | 11/2016 | Raleigh et al. |
| 9,532,210 B2 | 12/2016 | Hao et al. |
| 2005/0220115 A1* | 10/2005 | Romano ............ H04L 49/90 370/395.4 |
| 2009/0190558 A1* | 7/2009 | Strutt .............. H04L 1/0019 370/332 |
| 2012/0327779 A1 | 12/2012 | Gell et al. |
| 2014/0012970 A1 | 1/2014 | Parry et al. |
| 2014/0181257 A1 | 6/2014 | Sridhar et al. |
| 2014/0372624 A1 | 12/2014 | Wang et al. |
| 2015/0012584 A1 | 1/2015 | Lo et al. |
| 2015/0052193 A1 | 2/2015 | Farrell et al. |
| 2016/0050606 A1 | 2/2016 | Karaoguz et al. |
| 2016/0135077 A1 | 5/2016 | Streijl et al. |
| 2016/0173388 A1 | 6/2016 | Alam et al. |
| 2016/0294511 A1 | 10/2016 | Maheshwari et al. |
| 2016/0316351 A1* | 10/2016 | Kodaypak ............. H04W 8/005 |
| 2016/0316388 A1 | 10/2016 | Rosen |
| 2017/0013421 A1* | 1/2017 | Kodaypak ............... H04W 4/06 |

OTHER PUBLICATIONS

"LTE Broadcast: Evolve New Business Models", quickplay.com, Oct. 18, 2015.
Luby, Michael, "Best Practices for Mobile Broadcast Delivery and Playback of Multimedia Content", IEEE International Symposium on Broadband Multimedia Systems and Broadcasting, Jun. 2012, 1-7.

* cited by examiner

US 10,291,941 B2

PRE-CACHING VIDEO CONTENT TO DEVICES USING LTE BROADCAST

FIELD OF THE DISCLOSURE

The subject disclosure relates to delivery of content to devices, and more particularly to a system for pre-caching video content to devices using LTE broadcasting including detecting and forecasting congestion on the LTE broadcasting network and scheduling delivery of content.

BACKGROUND

A content provider system typically communicates with a large number of subscribers' digital video recorder (DVR) devices over a network. It is desirable to deliver video content over the network efficiently and with minimum network congestion.

BRIEF DESCRIPTION OF THE DRAWINGS

Reference will now be made to the accompanying drawings, which are not necessarily drawn to scale, and wherein.

DETAILED DESCRIPTION

Figure 1:
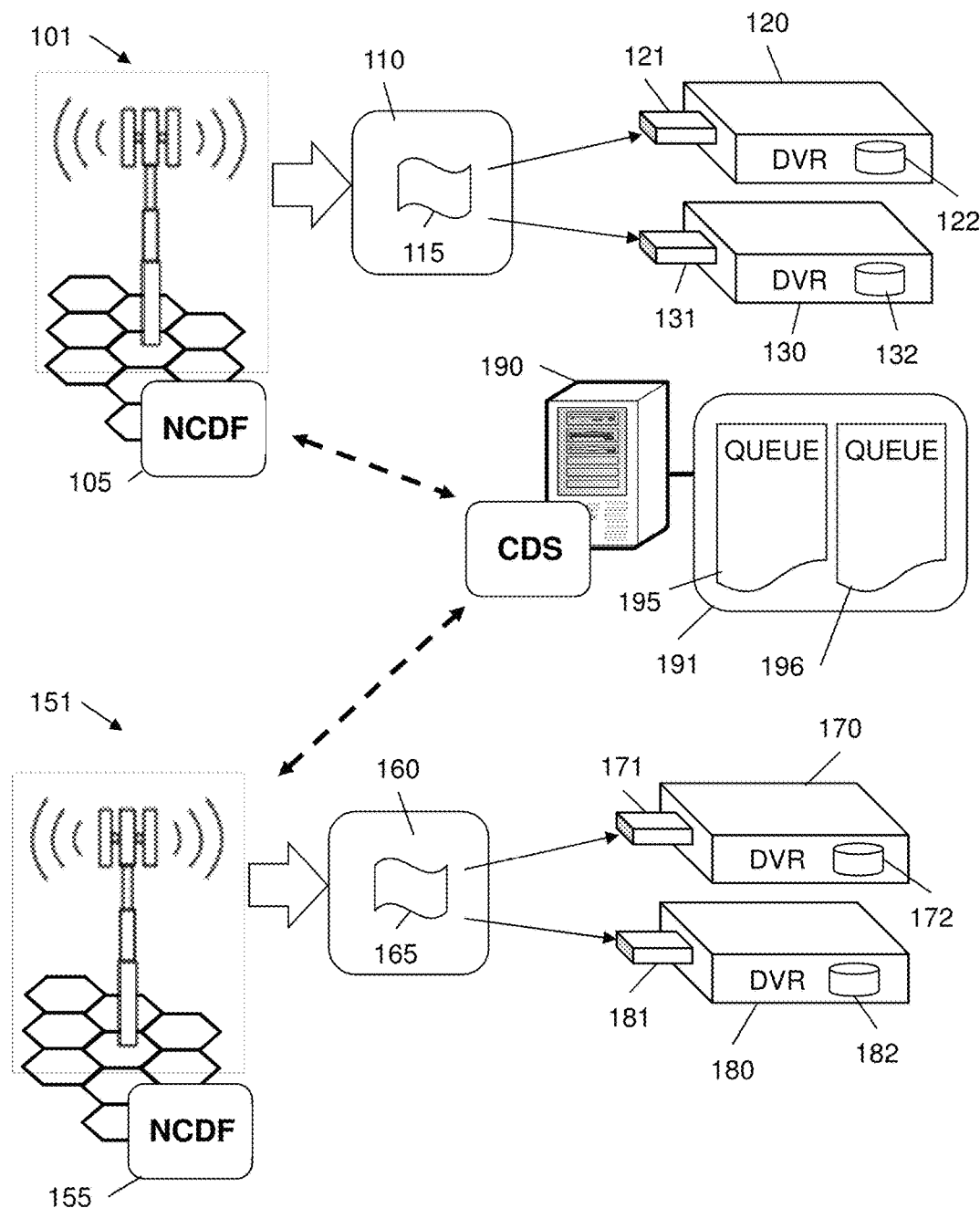
FIG. 1 schematically illustrates a system for pre-caching video content to devices using LTE broadcasting, in accordance with embodiments of the disclosure.

The subject disclosure describes, among other things, illustrative embodiments for delivering video content to devices using LTE broadcasting, where the delivering is scheduled in accordance with detecting and forecasting congestion at a cell site on the LTE network. Other embodiments are described in the subject disclosure.

One or more aspects of the subject disclosure include a method comprising receiving, by a processing system including a processor, items of media content for delivery to devices over a broadcast network, and delivering the items of media content according to a schedule determined by a content delivery scheduling system in communication with the processing system. The method also comprises detecting a level of network capacity utilization of the network at the processing system; generating periodically at a predetermined interval a forecast of the level of network capacity utilization; and transmitting the forecast to the content delivery scheduling system, where the forecast covers the interval beginning at a time of transmission of the forecast. The method further comprises generating and transmitting a new forecast, responsive to a deviation from the forecast, during the interval, of the detected level of network capacity utilization that exceeds a predetermined tolerance. Broadcast resources for delivering the items of media content are dynamically assigned to the processing system by the content delivery scheduling system in accordance with a current forecast. The items of media content comprise a queue accessible to the content delivery scheduling system; the generating and transmitting of the forecast by the processing system are paused responsive to a first message from the content delivery scheduling system indicating that the queue is empty of items of media content, and are resumed responsive to a second message from the content delivery scheduling system that the queue has an item of media content.

One or more aspects of the subject disclosure include a device comprising a processing system including a processor, and a memory that stores executable instructions that, when executed by the processing system, facilitate performance of operations. The operations comprise receiving items of media content for delivery to devices over a broadcast network; delivering the items of media content according to a schedule determined by a content delivery scheduling system in communication with the processing system; detecting a level of network capacity utilization of the broadcast network at the processing system; generating periodically at a predetermined interval a forecast of the level of network capacity utilization; and transmitting the forecast to the content delivery scheduling system, where the forecast covers the interval beginning at a time of transmission of the forecast. The operations also comprise generating and transmitting a new forecast, responsive to a deviation from the forecast, during the interval, of the detected level of network capacity utilization that exceeds a predetermined tolerance. Resources for delivering the items of media content are dynamically assigned to the processing system by the content delivery scheduling system in accordance with a current forecast. The items of media content comprise a queue accessible to the content delivery scheduling system, and the queue is maintained by the content delivery scheduling system and is uniquely assigned to the processing system.

One or more aspects of the subject disclosure include a machine-readable storage medium comprising executable instructions that, when executed by a processing system including a processor, facilitate performance of operations. The operations comprise receiving items of media content for delivery to devices over a broadcast network; delivering the items of media content according to a schedule determined by a content delivery scheduling system in communication with the processing system; detecting a level of network capacity utilization of the network at the processing system; generating periodically at a predetermined interval a forecast of the level of network capacity utilization; and transmitting the forecast to the content delivery scheduling system, where the forecast covers the interval beginning at a time of transmission of the forecast. The operations also comprise generating and transmitting a new forecast, responsive to a deviation from the forecast, during the interval, of the detected level of network capacity utilization that exceeds a predetermined tolerance. Resources for delivering the items of media content are dynamically assigned to the processing system by the content delivery scheduling system in accordance with a current forecast. The items of media content comprise a queue accessible to the content delivery scheduling system, and the items of media content are delivered responsive to a command from the content delivery scheduling system.

FIG. 1 schematically illustrates a system 100 for delivering video content to client devices, in which multiple cell sites 101, 151 communicate with a remotely located content delivery system 190. In this embodiment, cell sites 101, 151 correspond to evolved node B (eNB) locations in a cellular communication network, transmitting video content 115, 165 via long term evolution (LTE-B) broadcasts 110, 160. Each of the client devices 120, 130, 170, 180 includes a digital video recorder (DVR). The DVRs are provided with adapters 121, 131, 171, 181 for receiving the LTE-B broadcast content and providing the content in a format suitable for DVR storage and playback. In this embodiment, the adapters are wireless network bridge devices, e.g. mobile evolved multimedia broadcast multicast service (eMBMS) routers, installed as dongles at the respective DVRs. The DVRs also include cache storage 122, 132, 172, 182 for storing the video content received via broadcast. It will be appreciated that a continuously refreshed pool of video content can thus be created at each DVR. In an embodiment, the LTE-B video content broadcasts are scheduled for off-peak times (that is, when traffic on the cellular network is relatively low).

According to embodiments of the disclosure, each cell site 101, 151 includes, or has access to, a network congestion detection and forecasting (NCDF) component 105, 155 that transmits forecasts of network capacity utilization to a content delivery scheduling (CDS) component of content delivery system 190. A schedule for delivery of content (to the cell site and thence to the DVRs), and resources for delivering that content, are dynamically determined for each cell site by the CDS, based on the forecasts supplied by the NCDFs of the respective cell sites. Resources can include spectrum, software, or hardware resources, or any combination thereof, for transmitting the media content.

Content to be delivered is queued in a task area 191 accessible to the CDS. As shown in FIG. 1, the CDS can access multiple queues 195, 196; each cell site communicating with the CDS has a distinct and uniquely assigned content queue (e.g. queue 195 for cell site 101, queue 196 for cell site 151). In this embodiment, the content queues are local to the CDS; alternatively, they may be located elsewhere (e.g. in cloud storage) and retrieved when a delivery command is to be transmitted to a cell site.

Figure 2:
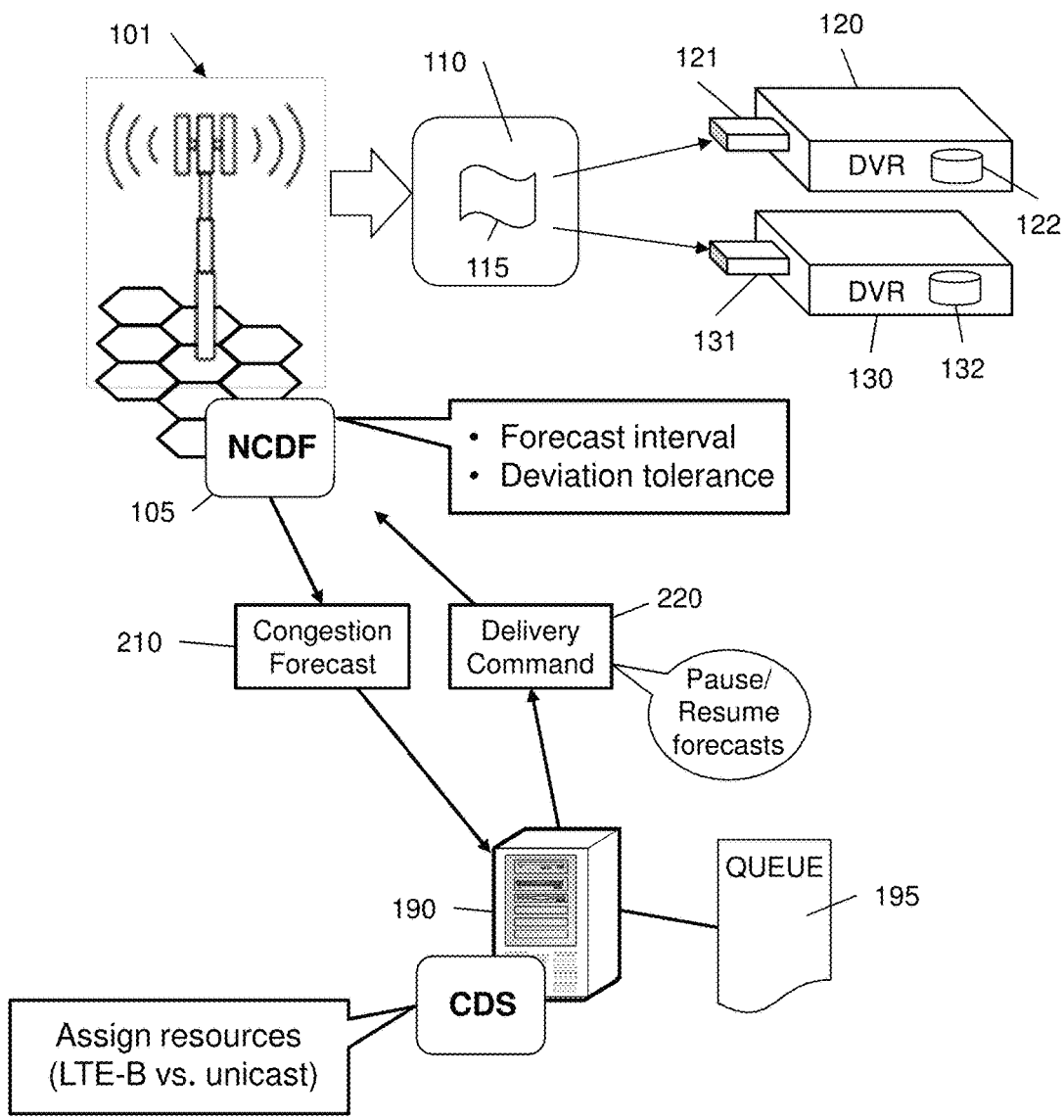
FIG. 2 schematically illustrates detecting and forecasting congestion on an LTE broadcasting network and scheduling delivery of content over the network, using the system of FIG. 1.

FIG. 2 schematically illustrates detecting and forecasting congestion on an LTE network and scheduling delivery of content over the network, using the system of FIG. 1. In the example shown in FIG. 2, content delivery system 190 communicates with one cell site 101, which broadcasts to two client devices 120, 130; in practice, system 190 can communicate with a large number of cell sites, and each cell site can communicate with a large number of devices. As shown in FIG. 2, cell site 101 transmits congestion forecasts 210 generated by the NCDF 105 to the CDS, and receives content delivery commands 220.

According to embodiments of the disclosure, NCDF 105 detects network congestion (that is, the level of utilization of network capacity) at cell site 101, and forecasts the level of congestion for a predetermined interval. In this embodiment, the forecast interval is one minute; accordingly, the NCDF generates a forecast covering the next minute, and transmits the congestion forecast 210 to the CDS. It will be appreciated that since the NCDF forecasts for the local cell site, and periodic forecasts are sent rather than real-time reports, the amount of reporting data transmitted on the network can be reduced. In this example, a forecast is routinely generated and transmitted once per minute, until the NCDF receives a signal from the CDS that the content queue is empty, or unless the congestion exceeds the forecast by an amount greater than a predetermined tolerance, as detailed below.

The actual level of network utilization will generally deviate from the forecast. The NCDF compares the deviation with a predetermined tolerance level. If the deviation exceeds the tolerance level, a forecast for the next minute is instantly sent to the CDS; this permits the CDS to adjust the delivery commands. This new forecast is additional to the routine forecasts.

In an example, the forecast interval is set at 1 minute, and the deviation tolerance level is set at 1% of network capacity utilization. The most recent forecast, sent at 16:00:00, gives the expected utilization of network capacity at the cell site as 60% for the next minute (that is, from 16:00:01 to 16:01:00). If the actual utilization from 16:00:00-16:00:30 is between 59% and 61% but exceeds 61% at 16:00:31, the NCDF instantly produces a new forecast and sends the new forecast to the CDS.

In this embodiment, the CDS allocates available resources between LTE-B broadcast for video content and unicast traffic. For each cell site, the CDS uses an algorithm, using the current congestion forecast, to determine what resources on each cell site can be dedicated to LTE-B broadcasting to push out video content; the CDS then dynamically assigns resources for the LTE-B broadcast. In an embodiment, the CDS optimizes network performance by utilizing idle network capacity for delivering video content via LTE-B without impacting higher-priority communications (e.g. unicast communications), while increasing asset utilization and total throughput.

The CDS algorithm compares capacity used by LTE broadcasting against capacity used by unicasting, and releases some or all of the resources used by LTE-B if necessary. In this embodiment, the resources allocated to LTE-B correspond to the resources not required for unicasting. In an example, if the forecast indicates that the capacity utilization will exceed 80% in the next minute, and resources used by unicasting are within the range of 70%-75%, CDS will assign only 5% of the resources to LTE-B; if the resources used by unicast exceed 75%, CDS will release any resources used by LTE-B.

After assigning the resources for LTE-B, CDS transmits delivery command 220, instructing cell site 101 to deliver video content from queue 195 to the client devices 120, 130 using LTE-B. In an embodiment, if the content queue 195 is empty, CDS sends a "pause" signal to NCDF to pause the sending of forecasts from cell site 101. If new content is added, CDS sends a "resume" signal to NCDF to resume the sending of forecasts.

Figure 3:
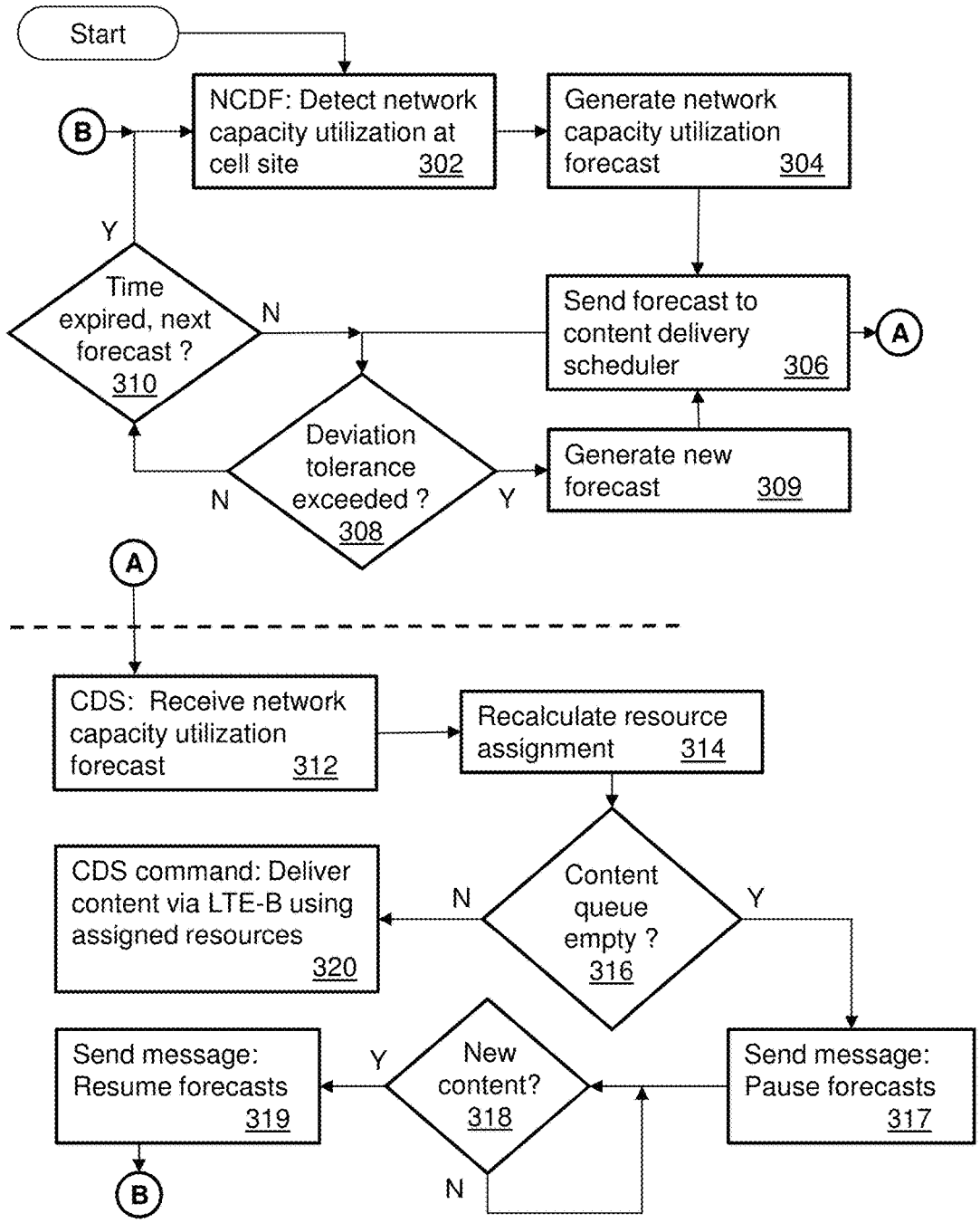
FIG. 3 depicts an illustrative embodiment of a method used in portions of the systems described in FIGS. 1-2.

FIG. 3 is a flowchart depicting a method 300 used in portions of the systems described in FIGS. 1-2, in accordance with embodiments of the disclosure. In this method, steps 302-310 comprise operations performed by the NCDF, and steps 312-320 comprise operations performed by the CDS. In step 302, the NCDF detects network capacity utilization at its local cell site. The NCDF generates a network capacity utilization forecast for the next time interval (step 304), and sends the forecast to the CDS (step 306). During that time interval, if the network capacity utilization deviates from the forecast by an amount greater that the predetermined tolerance (step 308), the NCDF immediately generates a new forecast (step 309) and transmits the new forecast to the CDS. If the deviation tolerance has not been exceeded and a new forecast is not needed, the NCDF generates the next forecast when the time interval expires (step 310).

The CDS receives the forecast (step 312) and recalculates resources to be assigned to LTE-B broadcasting based on the forecast (step 314). If the content queue for the cell site is not empty (step 316), the CDS sends a command (step 320) to deliver the content. In response to the command, the cell site receives the content and transmits the content to its associated client devices in a LTE-B broadcast.

If the content queue is empty, the CDS sends a message to the cell site to pause the NCDF forecasts (step 317). When new content becomes available (step 318), the CDS sends another message directing that the NCDF forecasts be resumed (step 319).

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

It will be appreciated that pre-caching video content to devices using LTE broadcasting, including detecting and forecasting congestion on a LTE broadcasting network and scheduling delivery of content, according to various embodiments of the disclosure, examples of which are described herein, can be used in mobile communications including, but not limited to, fourth generation long term evolution (4G LTE) communications described in whole or in part by standards bodies such as Third Generation Partnership Project (3GPP). Embodiments of the disclosure may also be applicable to technologies evolving from 4G LTE, such as LTE Advanced (3GPP Release 10), LTE Advanced Pro (3GPP Release 13), and fifth generation radio access networks (5G RAN).

Figure 4:
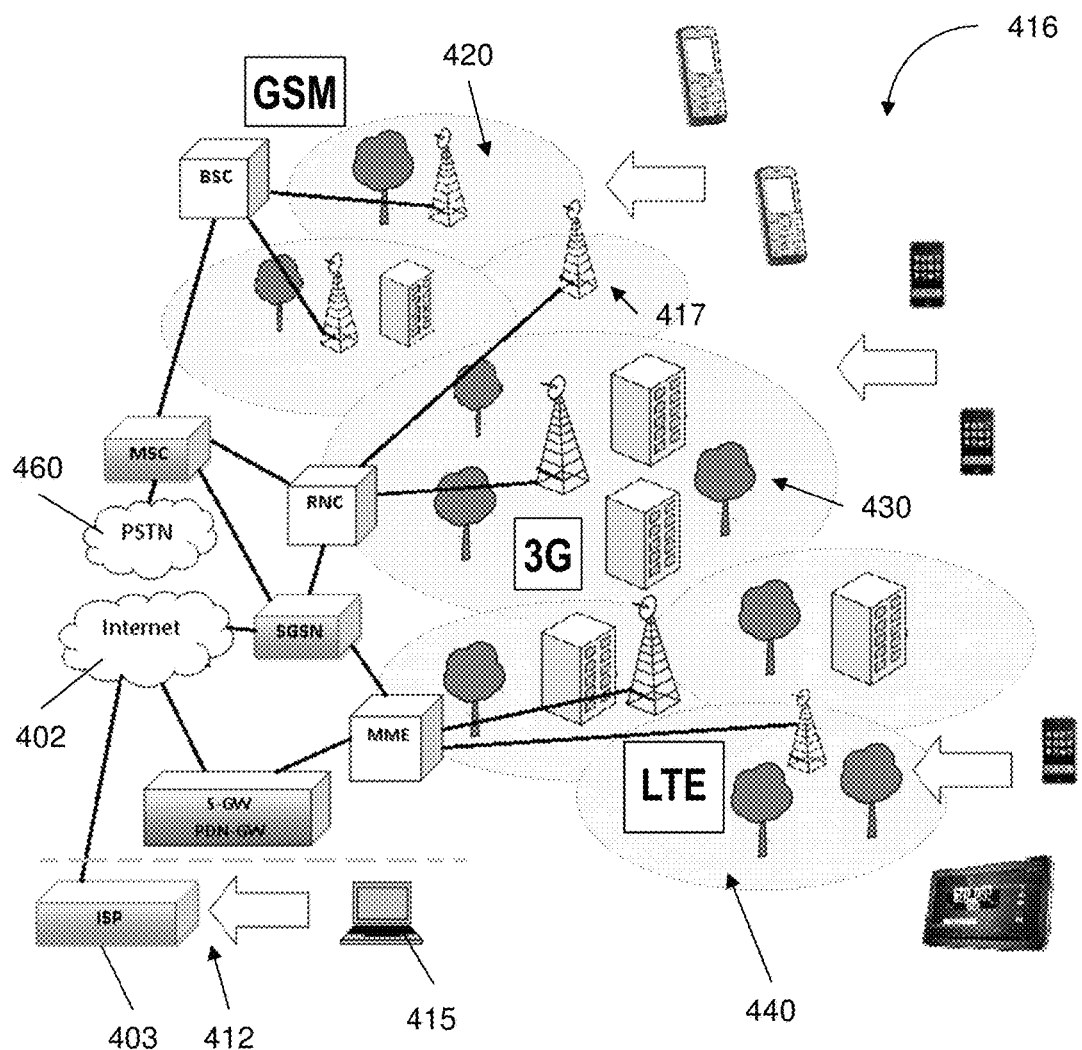
FIGS. 4-5 depict illustrative embodiments of systems that provide communications services to the devices of FIGS. 1-2.

FIG. 4 depicts an illustrative embodiment of an architecture 400 for a network for interacting with mobile communication devices. According to an embodiment of the disclosure, a mobile device 416 (which may correspond to a UE 110) can connect with one or more of the networks shown in FIG. 4 using a personal credential and a mobile device gateway. Mobile devices 416 may represent a variety of technologies (phones, tablets, etc.) and may have an end-to-end connection established with either the Public Switched Telephone Network (PSTN) 440, in the case of voice traffic, or an internet protocol network (Internet) 402, in the case of data traffic. The architecture can include a Global System for Mobile (GSM) network 420, a 3G network 430, and/or a Long Term Evolution (LTE) network 440. In particular, LTE specifications define an all-internet protocol architecture with voice over internet protocol (VoIP).

FIG. 4 also illustrates a device 415 accessing the network through a broadband connection 412 to an Internet Service Provider (ISP) 403. Any of devices 415-416 can include a processing system including a processor and a memory that stores executable instructions that, when executed by the processing system, facilitate performance of operations. The operations can comprise receiving items of media content for delivery to devices over a broadcast network; delivering the items of media content according to a schedule determined by a content delivery scheduling system in communication with the processing system; detecting a level of network capacity utilization of the broadcast network at the processing system; generating periodically at a predetermined interval a forecast of the level of network capacity utilization; and transmitting the forecast to the content delivery scheduling system, where the forecast covers the interval beginning at a time of transmission of the forecast. The operations can also comprise generating and transmitting a new forecast, responsive to a deviation from the forecast, during the interval, of the detected level of network capacity utilization that exceeds a predetermined tolerance. Resources for delivering the items of media content can be dynamically assigned to the processing system by the content delivery scheduling system in accordance with a current forecast. The items of media content can comprise a queue accessible to the content delivery scheduling system, and the queue can be maintained by the content delivery scheduling system and be uniquely assigned to the processing system.

Figure 5:
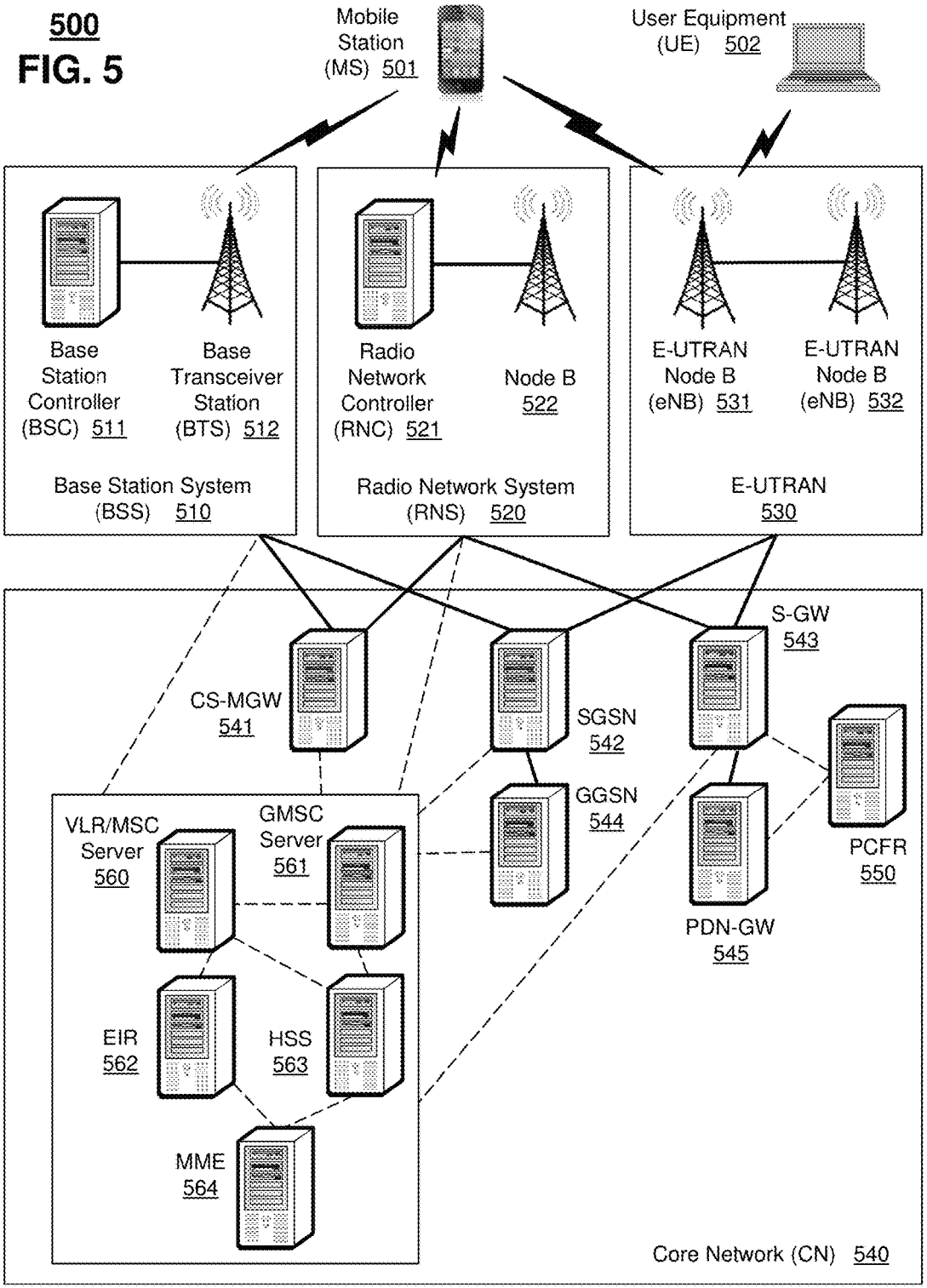

FIG. 5 schematically illustrates a communication system 500 in which one or more embodiments of the subject disclosure may be implemented. Mobile Station 501 may be one of, but not limited to, a cellular telephone, a cellular telephone in combination with another electronic device or any other wireless mobile communication device. According to an embodiment of the disclosure, Mobile Station 501 and/or User Equipment 502 can communicate wirelessly with one or more of the systems shown in FIG. 5.

Mobile Station 501 may communicate wirelessly with Base Station System (BSS) 510. BSS 510 contains a Base Station Controller (BSC) 511 and a Base Transceiver Station (BTS) 512. BSS 510 may include a single BSC 511/BTS 512 pair (Base Station) or a system of BSC/BTS pairs which are part of a larger network. BSS 510 is responsible for communicating with Mobile Station 501 and may support one or more cells. BSS 510 is responsible for handling cellular traffic and signaling between Mobile Station 501 and Core Network 540. BSS 510 can perform functions that include, but are not limited to, digital conversion of speech channels, allocation of channels to mobile devices, paging, and transmission/reception of cellular signals.

Additionally, Mobile Station 501 may communicate wirelessly with Radio Network System (RNS) 720. RNS 720 contains a Radio Network Controller (RNC) 721 and one or more Node(s) B 722. RNS 720 may support one or more cells. RNS 720 may also include one or more RNC 721/Node B 722 pairs or alternatively a single RNC 721 may manage multiple Nodes B 722. RNS 720 is responsible for communicating with Mobile Station 501 in its geographically defined area. RNC 721 is responsible for controlling the Node(s) B 722 that are connected to it and is a control element in a UMTS radio access network. RNC 721 can perform functions such as, but not limited to, load control, packet scheduling, handover control, security functions, as well as controlling access by Mobile Station 501 access to the Core Network (CN).

The evolved UMTS Terrestrial Radio Access Network (E-UTRAN) 530 is a radio access network that provides wireless data communications for Mobile Station 501 and User Equipment 502. E-UTRAN 530 provides higher data rates than traditional UMTS. It is part of the Long Term Evolution (LTE) upgrade for mobile networks; later releases meet the requirements of the International Mobile Telecommunications (IMT) Advanced and are commonly known as a 4G networks. E-UTRAN 530 may include a series of logical network components such as E-UTRAN Node B (eNB) 531 and E-UTRAN Node B (eNB) 532. E-UTRAN 530 may contain one or more eNBs. User Equipment 502 may be any user device capable of connecting to E-UTRAN 530 including, but not limited to, a personal computer, laptop, mobile device, wireless router, or other device capable of wireless connectivity to E-UTRAN 530. The improved performance of the E-UTRAN 530 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 5 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Mobile Station 501 may communicate with any or all of BSS 510, RNS 720, or E-UTRAN 530. In an illustrative system, each of BSS 510, RNS 720, and E-UTRAN 530 may provide Mobile Station 501 with access to Core Network 540. The Core Network 540 may include of a series of devices that route data and communications between end users. Core Network 540 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 541 is part of Core Network 540, and interacts with Visitor Location Register (VLR) and Mobile-Services Switching Center (MSC) Server 540 and Gateway MSC Server 541 in order to facilitate Core Network 540 resource control in the CS domain. Functions of CS-MGW 541 include, but are not limited to, media conversion, bearer control, payload processing and other mobile network processing such as handover or anchoring. CS-MGW 541 may receive connections to Mobile Station 501 through BSS 510, RNS 720 or both.

Serving GPRS Support Node (SGSN) 542 stores subscriber data regarding Mobile Station 501 in order to facilitate network functionality. SGSN 542 may store subscription information such as, but not limited to, the International Mobile Subscriber Identity (IMSI), temporary identities, or Packet Data Protocol (PDP) addresses. SGSN 542 may also store location information such as, but not limited to, the Gateway GPRS Support Node (GGSN) 544 address for each GGSN where an active PDP exists. GGSN 544 may implement a location register function to store subscriber data it receives from SGSN 542 such as subscription or location information.

Serving Gateway (S-GW) 543 is an interface which provides connectivity between E-UTRAN 530 and Core Network 540. Functions of S-GW 543 include, but are not limited to, packet routing, packet forwarding, transport level packet processing, event reporting to Policy and Charging Rules Function (PCRF) 550, and mobility anchoring for inter-network mobility. PCRF 550 uses information gathered from S-GW 543, as well as other sources, to make applicable policy and charging decisions related to data flows, network resources and other network administration functions. Packet Data Network Gateway (PDN-GW) 545 may provide user-to-services connectivity functionality including, but not limited to, network-wide mobility anchoring, bearer session anchoring and control, and IP address allocation for PS domain connections.

Home Subscriber Server (HSS) 543 is a database for user information; HSS 543 can store subscription data regarding Mobile Station 501 or User Equipment 502 for handling calls or data sessions. Networks may contain one HSS 543, or more if additional resources are required. Exemplary data stored by HSS 543 include, but is not limited to, user identification, numbering and addressing information, security information, or location information. HSS 543 may also provide call or session establishment procedures in both the PS and CS domains.

The VLR/MSC Server 540 can provide user location functionality. In an embodiment, when Mobile Station 501 enters a new network location, it begins a registration procedure. A MSC Server for that location transfers the location information to the VLR for the area. A VLR and MSC Server may be located in the same computing environment, as is shown by VLR/MSC Server 540, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 501 registration or procedures for handover of Mobile Station 501 to a different section of the Core Network 540. GMSC Server 541 may serve as a connection to alternate GMSC Servers for other mobile stations in larger networks.

Equipment Identity Register (EIR) 542 is a logical element which may store the International Mobile Equipment Identities (IMEI) for Mobile Station 501. In a typical embodiment, user equipment may be classified as either "white listed" or "black listed" depending on its status in the network. In one embodiment, if Mobile Station 501 is stolen and put to use by an unauthorized user, it may be registered as "black listed" in EIR 542, preventing its use on the network. Mobility Management Entity (MME) 544 is a control node which may track Mobile Station 501 or User Equipment 502 if the devices are idle. Additional functionality may include the ability of MME 544 to contact an idle Mobile Station 501 or User Equipment 502 if retransmission of a previous session is required.

Figure 6:
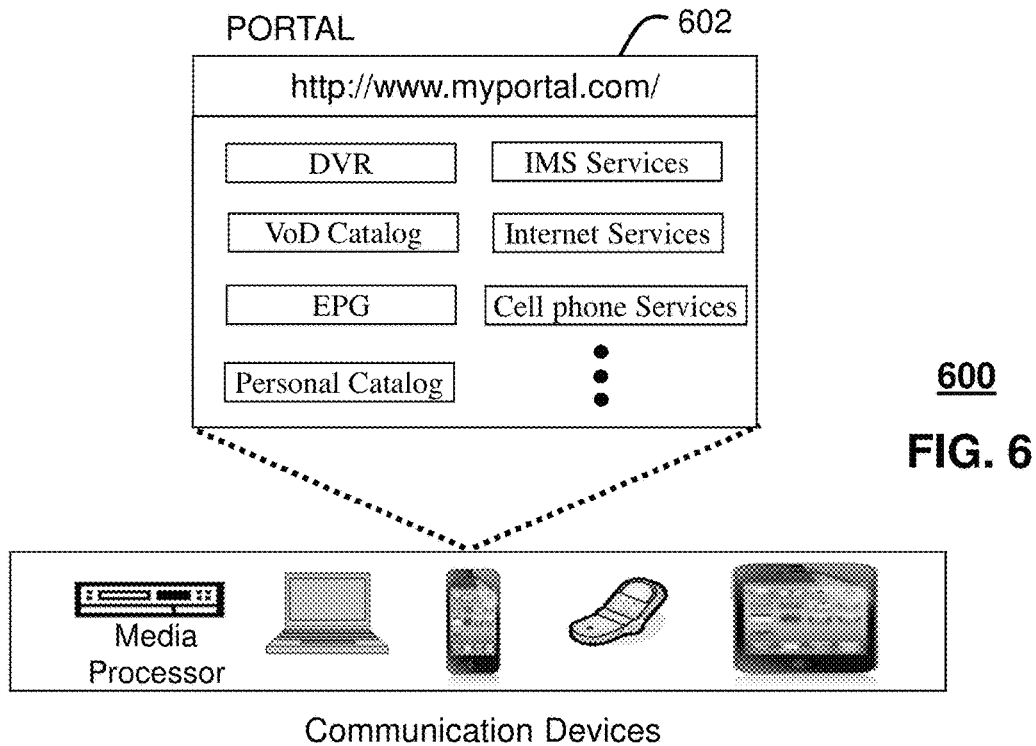
FIG. 6 depicts an illustrative embodiment of a web portal for interacting with the communication systems of FIGS. 1-2 and 4-5.

FIG. 6 depicts an illustrative embodiment of a web portal 602 of a communication system 600. Communication system 600 can be overlaid or operably coupled with the systems of FIGS. 1 and/or 2, communication system 400, and/or communication system 500 as another representative embodiment of the systems of FIGS. 1 and/or 2, communication system 400, and/or communication system 500. The web portal 602 can be used for managing services of the systems of FIGS. 1 and/or 2 and communication systems 400-500. A web page of the web portal 602 can be accessed by a Uniform Resource Locator (URL) with an Internet browser using an Internet-capable communication device such as those described in FIGS. 1 and/or 2 and FIGS. 4-5.

The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications to adapt these applications as may be desired by subscribers and/or service providers of the systems of FIGS. 1 and/or 2, and communication systems 400-500. Service providers can log onto an administrator account to provision, monitor and/or maintain the systems of FIGS. 1 and/or 2.

Figure 7:
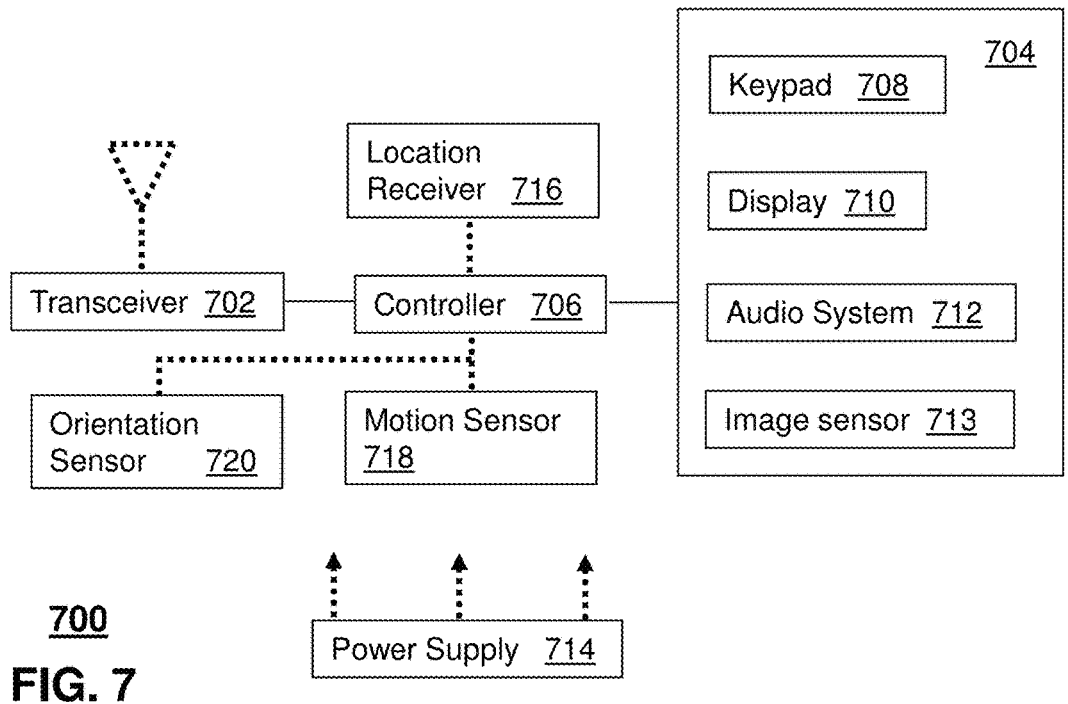
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1 and/or 2 and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1 and/or 2, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems of FIGS. 1 and/or 2, communication systems 400-500 of FIGS. 4-5 such as a gaming console and a media player.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
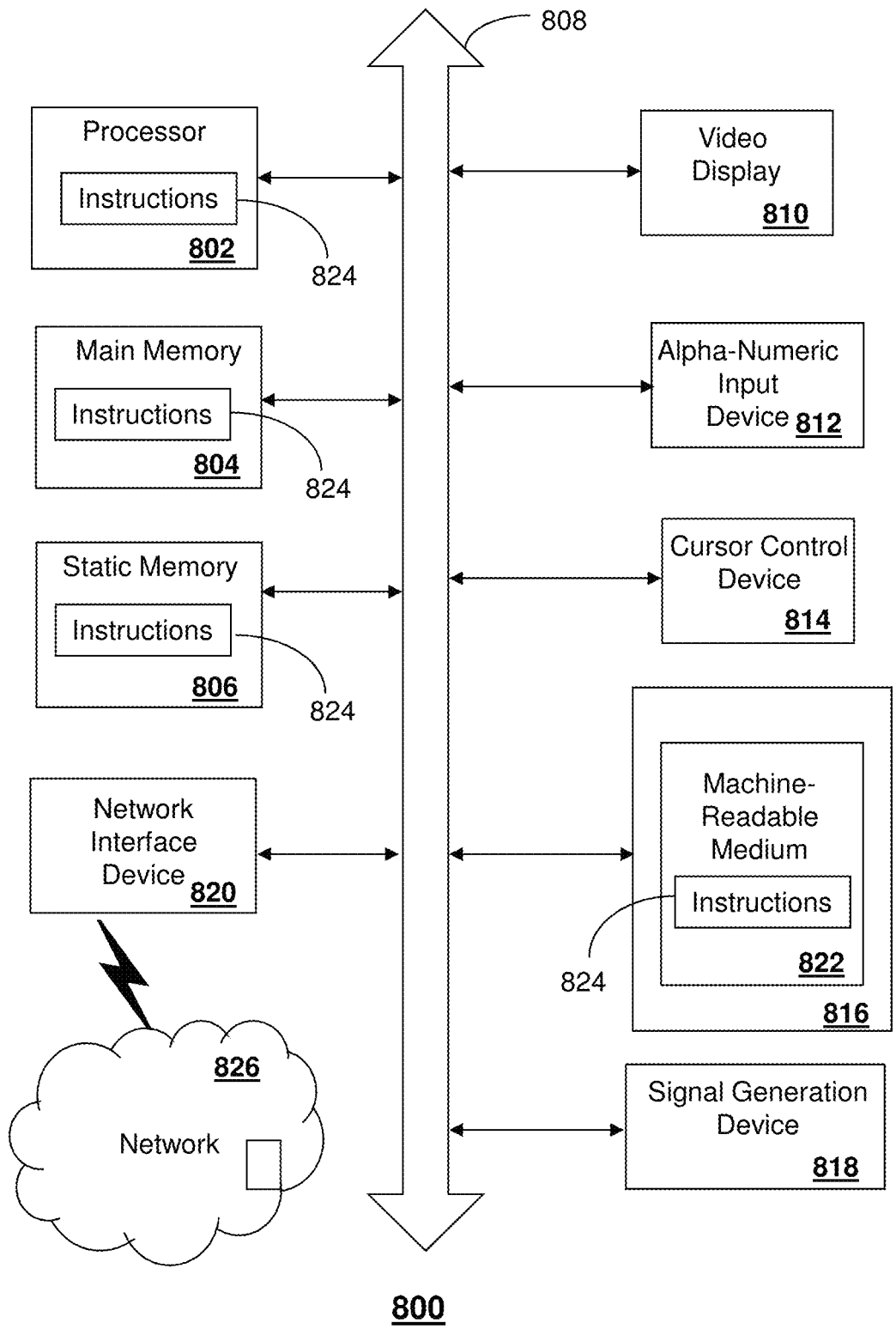
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the content delivery scheduler of system 190, the media processor 406, DVR 120, dongle 121, and other devices of FIGS. 1-2. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, by a processing system including a processor, items of media content for delivery to devices over a broadcast network;
delivering, by the processing system, the items of media content according to a schedule determined by a content delivery scheduling system in communication with the processing system;
detecting, by the processing system, a level of network capacity utilization of the broadcast network at the processing system;
generating, by the processing system, periodically at a predetermined interval a forecast of the level of network capacity utilization;
transmitting, by the processing system, the forecast to the content delivery scheduling system, wherein the forecast covers the interval beginning at a time of transmission of the forecast;
responsive to a deviation from the forecast, during the interval, of the detected level of network capacity utilization that exceeds a predetermined tolerance:
generating, by the processing system, a new forecast; and
transmitting, by the processing system, the new forecast,
wherein a resource for delivering the items of media content is dynamically assigned to the processing system by the content delivery scheduling system in accordance with a current forecast,
wherein the items of media content comprise a queue accessible to the content delivery scheduling system,
wherein the generating and transmitting of the forecast by the processing system are paused responsive to a first message from the content delivery scheduling system indicating that the queue is empty of items of media content, and are resumed responsive to a second message from the content delivery scheduling system that the queue has an item of media content,
wherein the resource for delivering the items of media content comprises a first portion of an available spectrum and corresponds to a long term evolution broadcast (LTE-B) spectrum, and wherein a second portion of the available spectrum corresponds to spectrum allocated to unicast traffic, and
wherein the resource is dynamically reassigned based on a detected second level of network capacity utilization of the unicast traffic at the processing system.

2. The method of claim 1, wherein the items of media content are delivered responsive to a command from the content delivery scheduling system.

3. The method of claim 1, wherein the broadcast network comprises a LTE-B network.

4. The method of claim 3, wherein the processing system comprises an evolved node B (eNB).

5. The method of claim 4, wherein the content delivery scheduling system is remote from the eNB.

6. The method of claim 3, wherein the items of media content are delivered to a client device that includes a mobile evolved multimedia broadcast multicast service (eMBMS) router.

7. The method of claim 1, wherein the available spectrum is allocated such that the second portion of the available spectrum has priority relative to the first portion of the available spectrum, the first portion of the available spectrum accordingly comprising a portion not required for unicasting.

8. The method of claim 1, wherein the queue is maintained by the content delivery scheduling system and is uniquely assigned to the processing system.

9. The method of claim 1, wherein the items of media content are delivered to a digital video recorder (DVR) device that includes cache storage.

10. The method of claim 1, wherein the queue is located in a cloud storage.

11. The method of claim 1, wherein at least one of the items of media content are delivered to an adapter of a digital video recorder (DVR) device as an LTE-B broadcast, and wherein the adapter is configured to provide the at least one of the items of media content in a format suitable for DVR storage and playback.

12. A device comprising:
a processing system including a processor; and
a memory that stores executable instructions that, when executed by the processing system, facilitate performance of operations comprising:
receiving items of media content for delivery to devices over a network;
delivering the items of media content according to a schedule determined by a content delivery scheduling system in communication with the processing system;
detecting a level of network capacity utilization of the network at the processing system;
generating periodically at a predetermined interval a forecast of the level of network capacity utilization;
transmitting the forecast to the content delivery scheduling system, wherein the forecast covers the interval beginning at a time of transmission of the forecast;
responsive to a deviation from the forecast, during the interval, of the detected level of network capacity utilization that exceeds a predetermined tolerance:
generating a new forecast; and
transmitting the new forecast,
wherein a resource for delivering the items of media content is dynamically assigned to the processing system by the content delivery scheduling system in accordance with a current forecast,
wherein the items of media content comprise a queue accessible to the content delivery scheduling system,
wherein the queue is maintained by the content delivery scheduling system and is uniquely assigned to the processing system,
wherein the resource for delivering the items of media content comprises a first portion of an available spectrum and corresponds to a long term evolution broadcast (LTE-B) spectrum, and wherein a second portion of the available spectrum corresponds to spectrum allocated to unicast traffic, and
wherein the resource is dynamically reassigned based on a detected second level of network capacity utilization of the unicast traffic at the processing system.

13. The device of claim 12, wherein the generating and transmitting of the forecast are paused responsive to a first message from the content delivery scheduling system indicating that the queue is empty of items of media content, and are resumed responsive to a second message from the content delivery scheduling system that the queue has an item of media content.

14. The device of claim 12, wherein the items of media content are delivered responsive to a command from the content delivery scheduling system.

15. The device of claim 12, wherein the network has broadcast and unicast capabilities, and wherein the network comprises a LTE-B network.

16. The device of claim 15, wherein the processing system comprises an evolved node B (eNB).

17. A non-transitory machine-readable storage medium comprising executable instructions that, when executed by a processing system including a processor, facilitate performance of operations comprising:
 receiving items of media content for delivery to devices over a network;
 delivering the items of media content according to a schedule determined by a content delivery scheduling system in communication with the processing system;
 detecting a level of network capacity utilization of the network at the processing system;
 generating periodically at a predetermined interval a forecast of the level of network capacity utilization;
 transmitting the forecast to the content delivery scheduling system, wherein the forecast covers the interval beginning at a time of transmission of the forecast;
 responsive to a deviation from the forecast, during the interval, of the detected level of network capacity utilization that exceeds a predetermined tolerance:
 generating a new forecast; and
 transmitting the new forecast,
 wherein a resource for delivering the items of media content is dynamically assigned to the processing system by the content delivery scheduling system in accordance with a current forecast,
 wherein the items of media content comprise a queue accessible to the content delivery scheduling system,
 wherein the items of media content are delivered responsive to a command from the content delivery scheduling system,
 wherein the resource for delivering the items of media content comprises a first portion of an available spectrum and corresponds to a long term evolution broadcast (LTE-B) spectrum, and wherein a second portion of the available spectrum corresponds to spectrum allocated to unicast traffic, and
 wherein the resource is dynamically reassigned based on a detected second level of network capacity utilization of the unicast traffic at the processing system.

18. The non-transitory machine-readable storage medium of claim 17, wherein the generating and transmitting of the forecast are paused responsive to a first message from the content delivery scheduling system indicating that the queue is empty of items of media content, and are resumed responsive to a second message from the content delivery scheduling system that the queue has an item of media content.

19. The non-transitory machine-readable storage medium of claim 17, wherein the queue is maintained by the content delivery scheduling system and is uniquely assigned to the processing system.

20. The non-transitory machine-readable storage medium of claim 17, wherein the network comprises a LTE-B network.

* * * * *